US012793098B2

(12) United States Patent
Hirohata et al.

(10) Patent No.: US 12,793,098 B2
(45) Date of Patent: Nov. 10, 2026

(54) REWARD PROVIDING DEVICE, REWARD PROVIDING METHOD, AND A NON-TRANSITORY COMPUTER-READABLE STORAGE MEDIUM STORING A PROGRAM

(71) Applicant: HONDA MOTOR CO., LTD., Tokyo (JP)

(72) Inventors: Kei Hirohata, Tokyo (JP); Shinji Yasuhara, Tokyo (JP); Yuichi Nakamura, Tokyo (JP); Seiichi Kato, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 18/238,616

(22) Filed: Aug. 28, 2023

(65) Prior Publication Data

US 2024/0078570 A1 Mar. 7, 2024

(30) Foreign Application Priority Data

Sep. 1, 2022 (JP) ................................ 2022-139350

(51) Int. Cl.
*G06Q 30/0207* (2023.01)
*B60L 58/13* (2019.01)

(52) U.S. Cl.
CPC .......... *G06Q 30/0207* (2013.01); *B60L 58/13* (2019.02)

(58) Field of Classification Search
None
See application file for complete search history.

(56) References Cited

U.S. PATENT DOCUMENTS

| | | | | |
|---|---|---|---|---|
| 11,485,517 | B1 * | 11/2022 | Wiegman | B60L 50/60 |
| 2011/0227534 | A1 | 9/2011 | Mitsutani | |
| 2014/0018985 | A1 * | 1/2014 | Gupta | G01C 21/3469 180/65.265 |
| 2016/0114251 | A1 * | 4/2016 | Galic | A63F 13/40 463/25 |
| 2021/0146790 | A1 * | 5/2021 | Haskara | B60L 58/10 |
| 2022/0114610 | A1 | 4/2022 | Miyata | |
| 2022/0258638 | A1 * | 8/2022 | Harirchi | G06Q 30/0202 |

(Continued)

FOREIGN PATENT DOCUMENTS

| | | |
|---|---|---|
| JP | 2013-009539 A | 1/2013 |
| JP | 2013-055731 A | 3/2013 |

(Continued)

OTHER PUBLICATIONS

Office Action dated May 21, 2024 issued in the corresponding Japanese Patent Application No. 2022-139350 with the English machine translation thereof.

*Primary Examiner* — Chrystina E Zelaskiewicz
(74) *Attorney, Agent, or Firm* — Carrier, Shende & Associates P.C.; Fulchand P. Shende; Joseph P. Carrier

(57) ABSTRACT

A reward providing device comprises an acquiring section that acquires, when charging of the battery by a charging device is completed, battery state-of-charge information concerning a battery state of charge that is a state of charge of a battery provided to a moving body, and a reward providing section that provides a reward to the user of the moving body when the battery state of charge is less than or equal to a recommended upper limit state of charge that is an upper limit of a recommended charge rate set to be lower than a full charge, serving as a state of charge that is recommended.

13 Claims, 8 Drawing Sheets

(56) References Cited

U.S. PATENT DOCUMENTS

| | | | | |
|---|---|---|---|---|
| 2022/0261836 | A1* | 8/2022 | Kinomura | G06Q 50/40 |
| 2023/0108438 | A1* | 4/2023 | Mallia | B60L 53/14<br>700/286 |

FOREIGN PATENT DOCUMENTS

| | | | |
|---|---|---|---|
| JP | 2022-062637 | A | 4/2022 |
| WO | 2010/061465 | A1 | 6/2010 |

* cited by examiner

130

| STATE OF CHARGE P | MAGNITUDE OF REWARD R |
|---|---|
| 0≦P<PL | 0 |
| PL≦P≦PU | R1 |
| PU<P≦100 | 0 |

130A

| STATE OF CHARGE P | MAGNITUDE OF REWARD R |
|---|---|
| $0 \leqq P < PL$ | 0 |
| $PL \leqq P \leqq PU$ | $R2+(P-PL) \times (R1-R2)/(PU-PL)$ |
| $PU < P \leqq 100$ | 0 |

130B

| STATE OF CHARGE P | MAGNITUDE OF REWARD R |
|---|---|
| 0≦P<PL | 0 |
| PL≦P≦PU | R1 |
| PU<P≦100 | R1−(P−PU)×R1/(100−PU) |

130C

| STATE OF CHARGE P | MAGNITUDE OF REWARD R |
|---|---|
| $0 \leqq P < PL$ | $P \times R1/PU$ |
| $PL \leqq P \leqq PU$ | $R2 + (P-PL) \times (R1-R2)/(PU-PL)$ |
| $PU < P \leqq 100$ | 0 |

REWARD PROVIDING DEVICE, REWARD PROVIDING METHOD, AND A NON-TRANSITORY COMPUTER-READABLE STORAGE MEDIUM STORING A PROGRAM

CROSS-REFERENCE TO RELATED APPLICATIONS

This application is based upon and claims the benefit of priority from Japanese Patent Application No. 2022-139350 filed on Sep. 1, 2022, the contents of which are incorporated herein by reference.

BACKGROUND OF THE INVENTION

Field of the Invention

The present invention relates to a reward providing device, a reward providing method, and a non-transitory computer-readable storage medium storing a program.

Description of the Related Art

In recent years, in order to ensure access to affordable, reliable, sustainable, and modern energy for more people, research and development is being carried out on charging and supplying power to mobility vehicles equipped with a secondary battery that contributes to energy efficiency.

WO 2010/061465 A1 discloses performing slow charging when a charging state of a power storage device in a vehicle approaches a full charge.

SUMMARY OF THE INVENTION

As disclosed in WO 2010/061465 A1, there is a problem that the charging time is increased when performing slow charging.

The present invention has been devised taking into consideration the aforementioned problem, and has the object of providing improved energy efficiency.

A first aspect of the present invention is a reward providing device comprising: an acquiring section that acquires, when charging of the battery by a charging device is completed, state-of-charge information concerning a state of charge that is a charge amount of the battery provided to a moving body; and a reward providing section that provides a reward to a user of the moving body when the battery state of charge is less than or equal to a recommended upper limit state of charge that is an upper limit of a recommended state of charge set to be lower than a full charge, serving as a state of charge that is recommended.

A second aspect of the present invention is a reward providing method comprising: acquiring, when charging of the battery by a charging device is completed, battery state-of-charge information concerning a battery state of charge that is a charge amount of the battery provided to a moving body; and providing a reward to a user of the moving body when the battery state of charge is less than or equal to a recommended upper limit state of charge that is an upper limit of a recommended state of charge set to be lower than a full charge, serving as a state of charge that is recommended.

A third aspect of the present invention is a non-transitory computer-readable storage medium storing a program causing a computer to execute: acquiring, when charging of the battery by a charging device is completed, battery state-of-charge information concerning a battery state of charge that is a charge amount of the battery provided to a moving body; and providing a reward to a user of the moving body when the battery state of charge is less than or equal to a recommended upper limit state of charge that is an upper limit of a recommended state of charge set to be lower than a full charge, serving as a state of charge that is recommended.

According to the present invention, it is possible to encourage shortening of the battery charging time.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
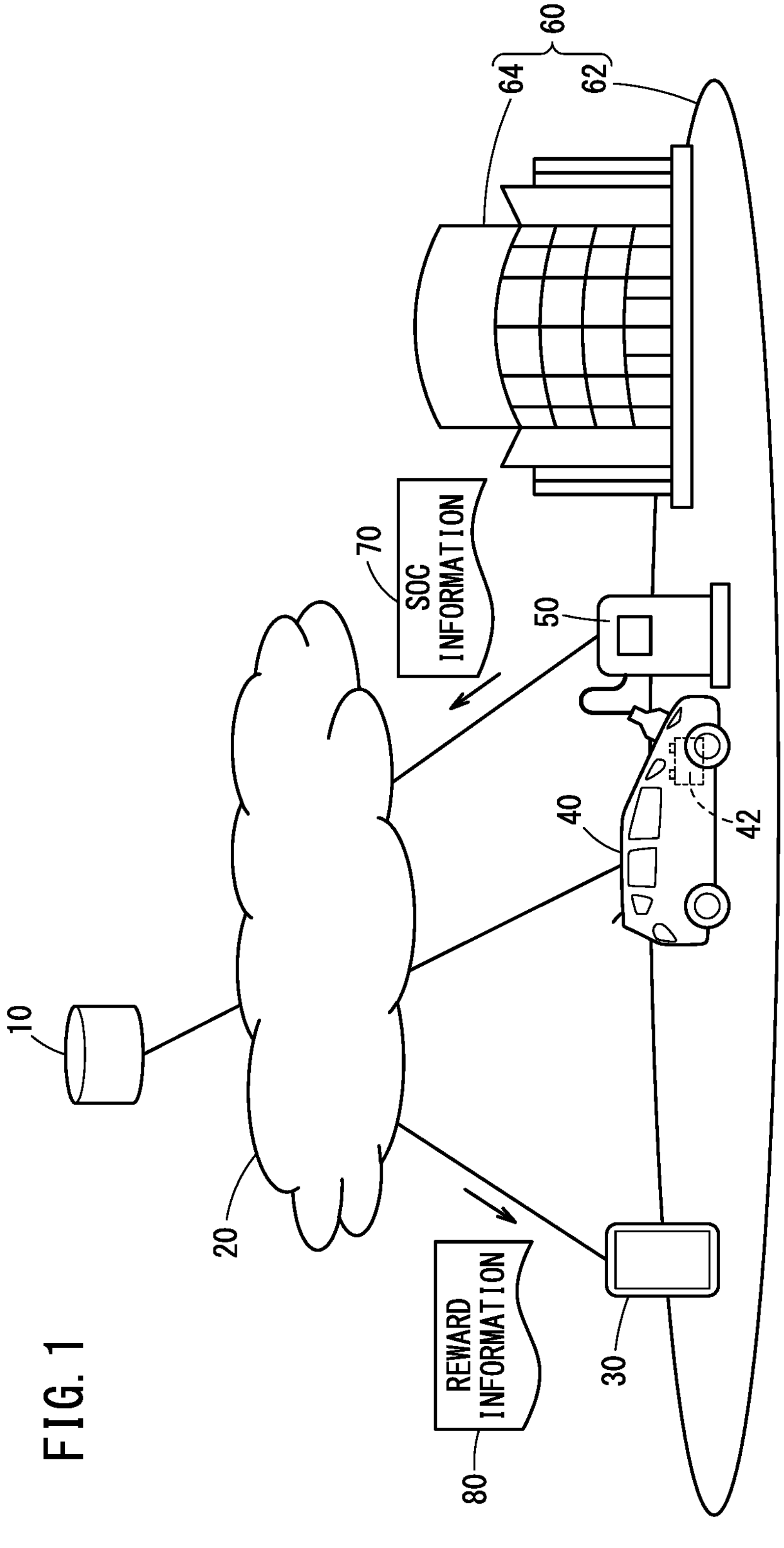
FIG. 1 schematically shows a configuration of a network connection of a reward providing device.

FIG. 1 schematically shows a configuration of a network connection of a reward providing device 10. The reward providing device 10 is connected, via a communication network 20, to a user terminal 30 and to a charging device 50 including a battery charging control system and a battery management system that charges a battery 42 provided to a moving body 40 of the user of the user terminal 30. The moving body 40 is an electric vehicle, for example. In the present embodiment, an example is described of a case where the moving body 40 is an electric vehicle. However, the moving body 40 may be another moving body such as a robot, aircraft, or the like.

The charging device 50 is installed in a parking lot 62 of an establishment 60. The establishment 60 includes the parking lot 62 and a shop 64. In the present embodiment, an example is described of a case where the charging device 50 is associated with the establishment 60, and the establishment 60 is a commercial establishment. However, the establishment 60 may be an establishment other than a commercial establishment, such as a road facility, for example. The charging device 50 may be installed at a location not associated with the establishment 60.

In the present embodiment, the reward providing device 10 is installed at a different location than the charging device 50 and the establishment 60. However, the reward providing device 10 may be installed at the location of the charging device 50 or the establishment 60.

When the charging of the battery 42 by the charging device 50 is complete, the charging device 50 transmits battery state-of-charge information 70 concerning the amount of charge, which is the SOC (State Of Charge) of the battery 42, to the reward providing device 10 via the communication network 20. The reward providing device 10 provides a reward to the user of the moving body 40, according to the SOC of the battery 42. The reward providing device 10 transmits reward information 80 concerning the reward provided to the user, to the user terminal 30 via the communication network 20.

Figure 2:
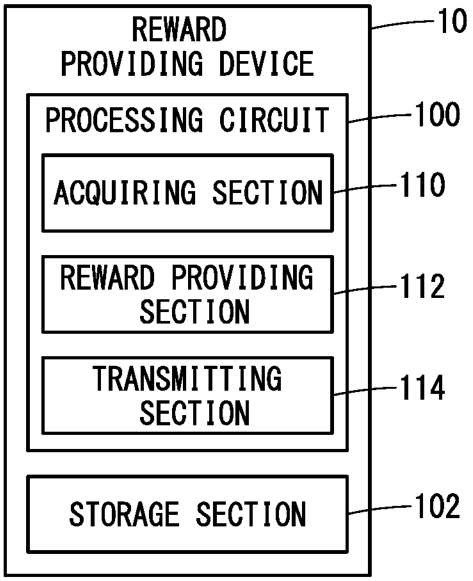
FIG. 2 is a block diagram schematically showing a configuration of the reward providing device.

FIG. 2 is a block diagram schematically showing a configuration of the reward providing device 10. The reward providing device 10 includes a processing circuit 100 and a storage section 102. The processing circuit 100 includes a processor such as a CPU or a GPU. The storage section 102 includes a volatile memory such as a RAM, and a nonvolatile memory such as a ROM or flash memory. The volatile memory is used as a working memory of the processor. The nonvolatile memory stores a program to be executed by the processor, and other necessary data.

The processing circuit 100 includes an acquiring section 110, a reward providing section 112, and a transmitting section 114. The acquiring section 110, the reward providing section 112, and the transmitting section 114 are realized by having the processing circuit 100 execute the program stored in the storage section 102. At least a portion of the acquiring section 110, the reward providing section 112, and the transmitting section 114 may be realized by an integrated circuit such as an ASIC or FPGA, or by an electronic circuit including a discrete device.

The acquiring section 110 acquires the battery SOC information 70 transmitted from the charging device 50 or the moving body 40, via the communication network 20. The battery SOC information 70 is information indicating the SOC of the battery 42 when the charging of the battery 42 by the charging device 50 is completed. The reward providing section 112 provides a reward to the user of the moving body 40, according to the SOC of the battery 42 when the charging of the battery 42 by the charging device 50 is completed. The transmitting section 114 transmits the reward information 80 concerning the reward provided to the user of the moving body 40 to the user terminal 30, via the communication network 20.

Figures 3A, 3B:
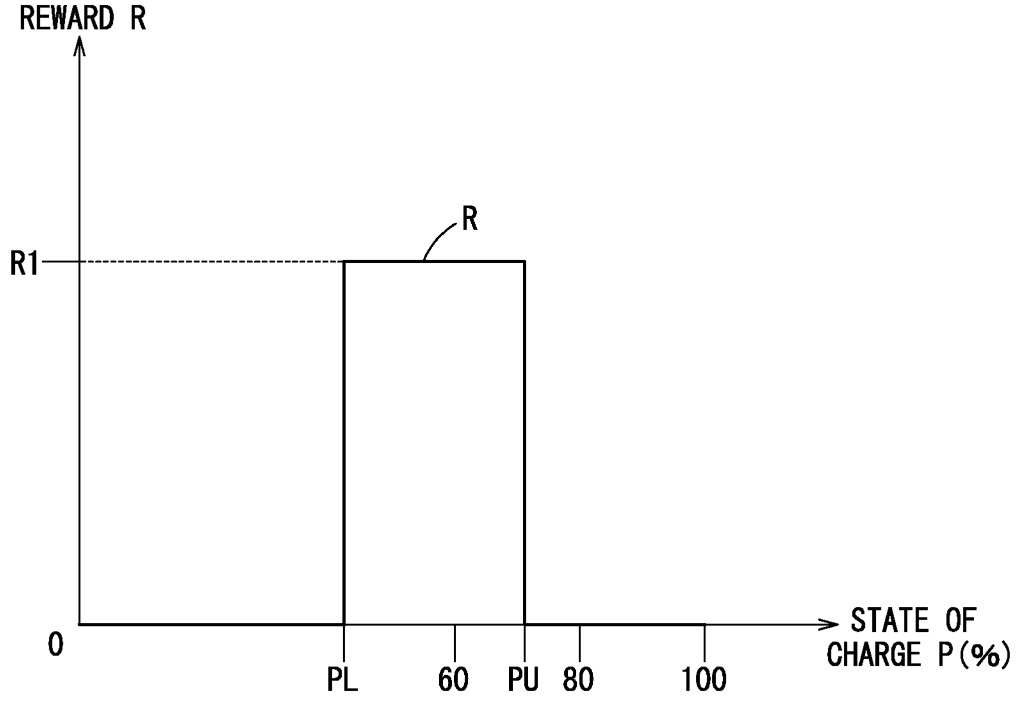
FIG. 3A is a graph showing an example of the magnitude of the reward provided according to the state of charge of the battery.
FIG. 3B is a graph showing an example of a table in which the magnitude of the reward provided according to the state of charge of the battery is set.

FIG. 3A is a graph showing an example of the magnitude of the reward R provided according to the SOC P of the battery 42. FIG. 3A shows the recommended upper limit SOC PU, which is the upper limit of a recommended SOC set to be lower than a full charge (100%), as a recommended SOC P. When the battery 42 is charged up to the SOC P, which is less than or equal to the recommended upper limit SOC PU, the charging efficiency is high, and therefore the charging time is expected to be short. The recommended upper limit SOC PU is set in advance. In the present embodiment, an example is described of a case where the recommended upper limit SOC PU is set in a range from 60% to 80%. However, the recommended upper limit SOC PU may be in another range that is based on the capabilities of the battery 42 or the like.

If the SOC P of the battery 42 is less than or equal to the recommended upper limit SOC PU, the user of the moving body is provided with the reward R. The magnitude of the reward R is R1. Since the charging efficiency is high, the user is encouraged to shorten the charging time. As shown in FIG. 3A, the reward R provided to the user when the charging amount P of the battery 42 is less than or equal to the recommended upper limit SOC PU is greater than the reward R provided to the user when the SOC P is higher than the recommended upper limit SOC PU. More specifically, a reward R is not provided to the user (R=0) if the SOC P is higher than the recommended upper limit SOC PU.

FIG. 3A shows a recommended lower limit SOC PL, which is a lower limit of the recommended SOC described above. The recommended lower limit SOC PL is set in advance, and is lower than the recommended upper limit SOC PU. There is a concern that degradation of the battery 42 will accelerate when charging of the battery 42 is performed at a SOC P that is lower than the recommended lower limit SOC PL. The user of the moving body 40 is provided with the reward R when the SOC P of the battery 42 is greater than or equal to the recommended lower limit SOC PL. Therefore, degradation of the battery 42 can be suppressed.

As shown in FIG. 3A, the reward R provided to the user when the SOC P of the battery 42 is greater than or equal to the recommended lower limit SOC PL is greater than the reward R provided to the user when the SOC P is lower than the recommended lower limit SOC PL. More specifically, the reward R is not provided to the user when the SOC P is lower than the recommended lower limit SOC PL. The magnitude of the reward R provided to the user when the SOC P is greater than or equal to the recommended lower limit SOC PL and less than or equal to the recommended upper limit SOC PU is a certain value R1.

FIG. 3B is a graph showing an example of a table 130 in which the magnitude of the reward R provided according to the SOC P of the battery 42 is set. The table 130 shown in FIG. 3B corresponds to the graph showing the magnitude of the reward R corresponding to the SOC P shown in FIG. 3A.

The magnitude of the reward R is zero when the SOC P is greater than or equal to zero and less than the recommended lower limit SOC PL ($0 \leq P < PL$). The magnitude of the reward R is R1 when the SOC P is greater than or equal to the recommended lower limit SOC PL and less than or equal to the recommended upper limit SOC PU ($PL \leq P \leq PU$). The magnitude of the reward R is zero when the SOC P is greater than the recommended upper limit SOC PU ($PU < P \leq 100$).

The table 130 is stored in advance in the storage section 102. The reward providing section 112 provides the reward R to the user of the moving body 40, based on the table 130 and the SOC P of the battery 42 acquired by the acquiring section 110. The transmitting section 114 transmits the reward information 80 concerning the reward R provided to the user, to the user terminal 30.

The user terminal 30 can display the reward R provided to the user in a screen, based on the reward information 80 received from the reward providing device 10. FIG. 4A shows an example in which a reward R that can be utilized when the user uses the charging device 50 is displayed in the screen 150 of the user terminal 30. The reward R that can be utilized when the user uses the charging device 50 is a discount for the usage fee of the charging device 50, for example.

A title 160 is shown in the topmost region in the screen 150 of the user terminal 30 shown in FIG. 4A. Messages 172, 174, and 176 concerning the charging fee are shown below the title 160 in the screen 150. A button 180 is displayed in the bottommost region in the screen 150.

In the example shown in FIG. 4A, "charging fee" is written in the title 160. An indication that the normal charging fee before the discount is 5,000 yen is written in the message 172. An indication that there is a discount of 500 yen, which is 10% of the normal charging fee is written in the message 174, as the reward R provided to the user. An indication that the invoice amount for the user is 4,500 yen is written in the message 176. The invoice amount is a monetary amount obtained by subtracting a monetary amount corresponding to 10% of the normal charging fee from the normal charging fee. When the user presses the button 180, the discounted charging fee of 4,500 yen is paid.

Figure 4B:
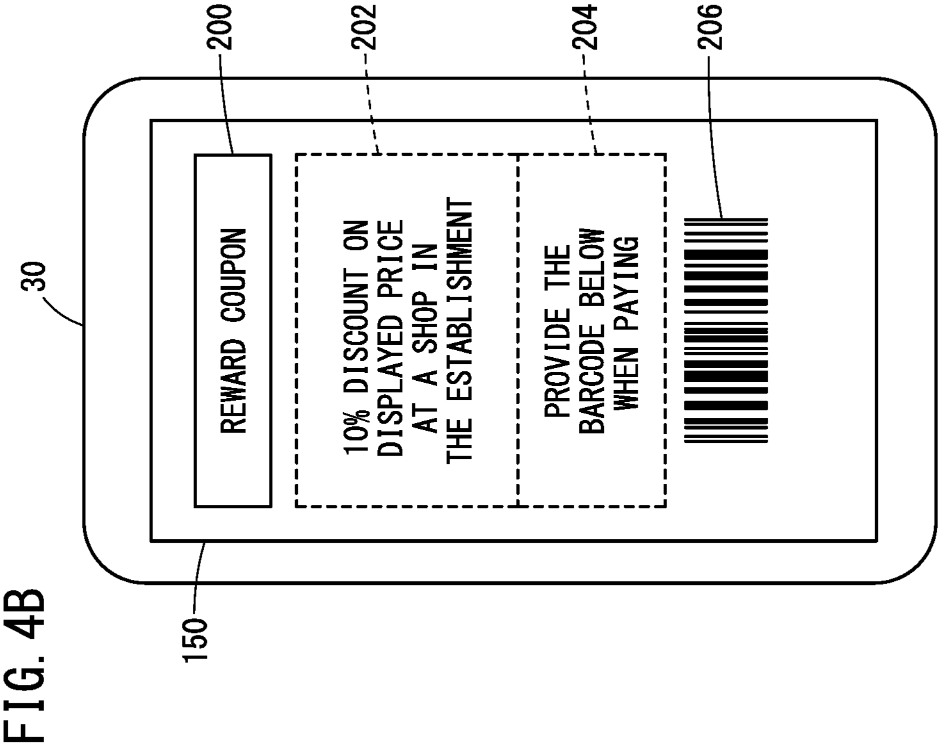
FIG. 4B shows an example of a reward that can be utilized when the user uses an establishment associated with the charging device.
Figure 4A:
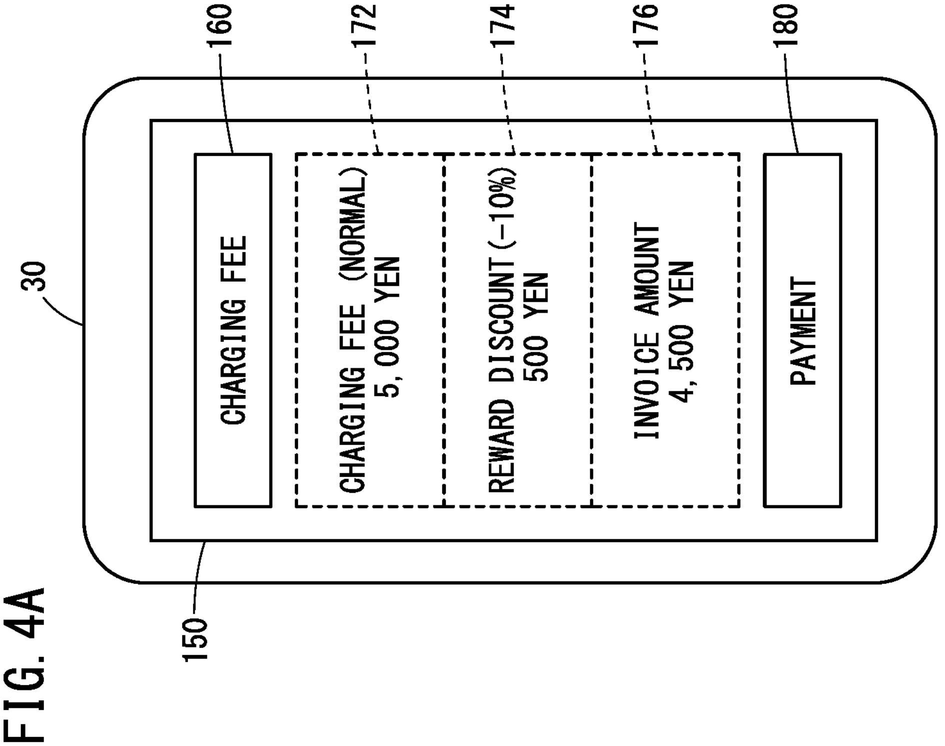
FIG. 4A shows an example in which a reward that can be utilized when a user uses a charging device is displayed in a screen of a user terminal.

FIG. 4B shows an example of a reward R that can be utilized when the user uses an establishment 60 associated with the charging device 50. If the establishment 60 is a commercial establishment, the reward R that can be utilized when the user uses the establishment 60 is a discount on the displayed price of a product or service provided by a shop 64 in the establishment 60. A title 200 is displayed in the topmost region of the screen 150 of the user terminal 30 shown in FIG. 4B. Messages 202 and 204 concerning the reward R usable by the user at the shop 64 in the establishment 60 is displayed below the title 200 in the screen 150. A barcode 206 is displayed in the bottommost region in the screen 150.

In the example shown in FIG. 4B, "reward coupon" is written in the title 200. A discount on the displayed price of a product or service provided by the shop 64 in the establishment 60 is written in the message 202, as an indication that the reward R is usable. An indication that the barcode 206 displayed in the screen 150 must be shown to a staff member when paying at the shop 64 in order for the user to receive the reward R is written in the message 204. The user can receive the discount by having the staff member read the barcode 206 with a barcode reader.

The reward R need not be a discount on the displayed price of a product or service provided by the shop 64 in the establishment 60. The reward R may be a discount on the usage fee of the parking lot 62 of the establishment 60, for example. If the establishment 60 is a road facility and not a commercial establishment, the reward R may be a discount on the usage fee (road toll) of the road facility. In such a case, the reward R is applied when a road toll payment system is used.

Figure 5:
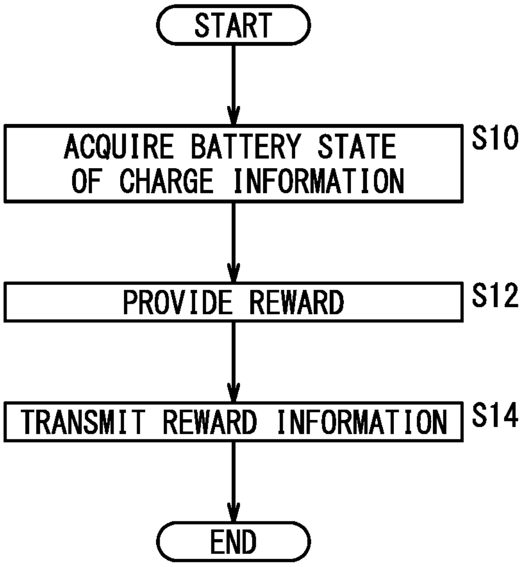
FIG. 5 is a flow chart showing a procedure of a reward providing process performed by the reward providing device.

FIG. 5 is a flow chart showing a procedure of a reward providing process performed by the reward providing device 10. This procedure is performed by having the processing circuit 100 included in the reward providing device 10 execute the program stored in the storage section 102. When this procedure is started, the battery SOC information 70 is transmitted from the charging device 50 or moving body 40 to the reward providing device 10 when the charging of the battery 42 by the charging device 50 is completed.

At step S10, the acquiring section 110 acquires the battery SOC information 70 that has been transmitted to the reward providing device 10, via the communication network 20. The battery SOC information 70 includes the SOC P of the battery 42 when charging of the battery 42 by the charging device 50 has been completed. At step S12, the reward providing section 112 provides the reward R to the user of the moving body 40 based on the table 130 stored in the storage section 102 and the SOC P of the battery 42.

At step S14, the transmitting section 114 transmits the reward information 80 concerning the reward R provided to the user to the user terminal 30, via the communication network 20. The reward R shown in FIG. 4A or 4B is displayed in the screen 150 of the user terminal 30. When the processing of step S14 ends, this procedure also ends.

Modifications

The embodiment described above may be modified in the following ways.

First Modification

Figures 6A, 6B:
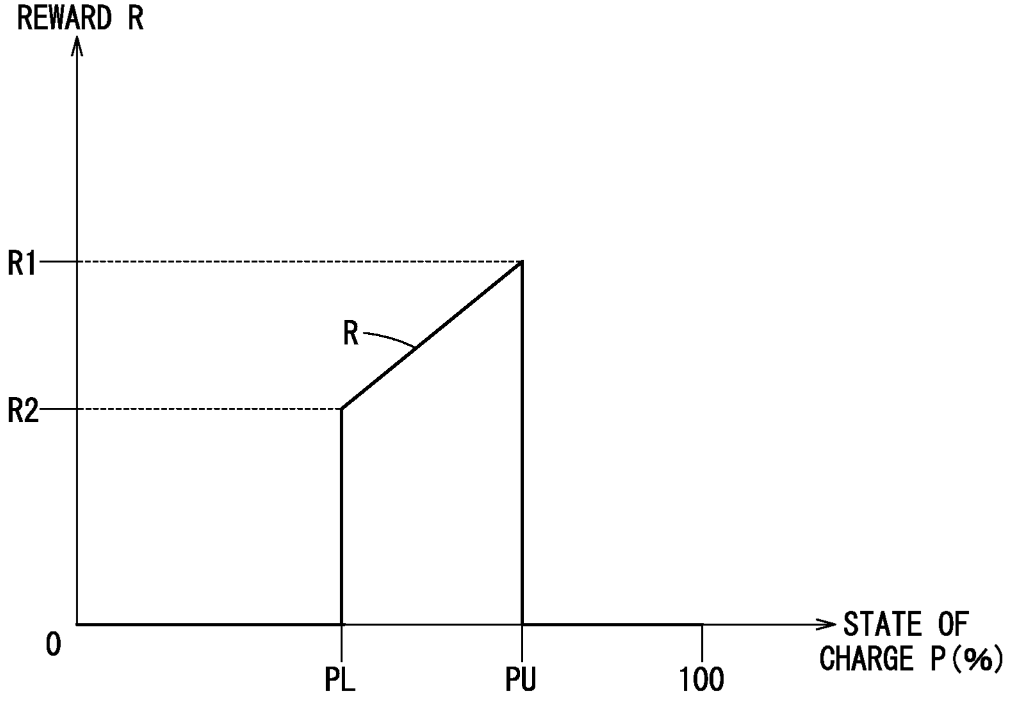
FIG. 6A is a graph showing an example of the magnitude of the reward provided according to the state of charge of the battery.
FIG. 6B shows an example of a table in which magnitudes of the reward provided according to the state of charge of the battery are set.

The magnitude of the reward R provided to the user when the SOC P is greater than or equal to the recommended lower limit SOC PL and less than or equal to the recommended upper limit SOC PU need not be constant. FIG. 6A is a graph showing an example of the magnitude of the reward R provided according to the SOC P of the battery 42. When the SOC P is equal to the recommended lower limit SOC PL, the magnitude of the reward R is R2. When the SOC P is equal to the recommended upper limit SOC PU, the magnitude of the reward R is R1.

The reward R provided to the user when the SOC P is greater than or equal to the recommended lower limit SOC PL and less than or equal to the recommended upper limit SOC PU is greater the higher the SOC P is. As shown in FIG. 6A, the reward R provided to the user when the SOC P of the battery 42 is greater than or equal to the recommended lower limit SOC PL and less than or equal to the recommended upper limit SOC PU is greater than the reward R provided to the user when the SOC P is higher than the recommended upper limit SOC PU.

FIG. 6B shows an example of a table 130A in which magnitudes of the reward R provided according to the SOC P of the battery 42 are set. The table 130A shown in FIG. 6B corresponds to the graph showing the magnitude of the reward R corresponding to the SOC P shown in FIG. 6A.

The magnitude of the reward R is zero if the SOC P is greater than or equal to zero and less than the recommended lower limit SOC PL ($0 \leq P < PL$). The magnitude of the reward R is expressed by Expression (1) if the SOC P is greater than or equal to the recommended lower limit SOC PL and less than or equal to the recommended upper limit SOC PU ($PL \leq P \leq PU$). The magnitude of the reward R is zero if the SOC P is greater than the recommended upper limit SOC PU ($PU < P \leq 100$). In other words, the one or more processors of the battery charging control system determine, during charging of the battery, a charging control parameter including a reward using SOC based on the following Expression (1).

$$R = R2 + (P - PL) \times (R1 - R2) / (PU - PL) \qquad \text{Expression(1):}$$

The table 130A is stored in advance in the storage section 102. The reward providing section 112 provides the reward R to the user of the moving body 40 based on the table 130A and the SOC P of the battery 42 acquired by the acquiring section 110. The transmitting section 114 transmits the reward information 80 concerning the reward R provided to the user to the user terminal 30.

Second Modification

The user may be provided with a reward R if the SOC P is greater than the recommended upper limit SOC PU. FIG.

7A is a graph showing an example of the magnitude of a reward R provided according to the SOC P of the battery 42. The magnitude of the reward R is R1 when the SOC P is equal to the recommended upper limit SOC PU. The magnitude of the reward R is zero when the SOC P is equal to a full charge.

Figures 7A, 7B:
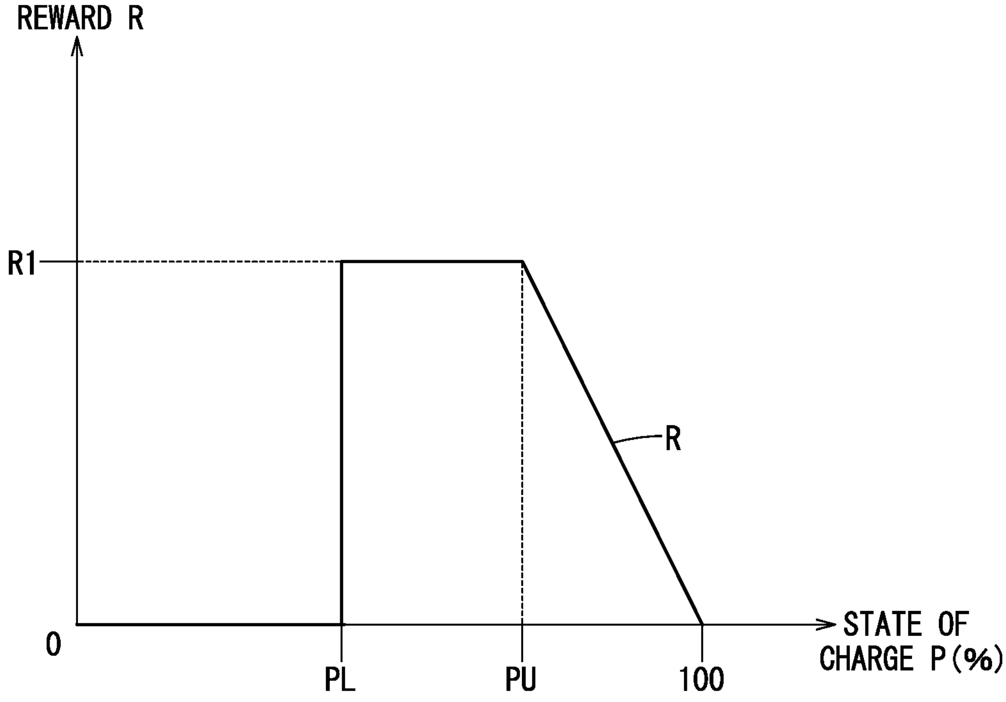
FIG. 7A is a graph showing an example of the magnitude of a reward provided according to the state of charge of the battery.
FIG. 7B shows an example of a table in which magnitudes of a reward provided according to the state of charge of the battery are set.

The reward R provided to the user when the SOC P is greater than the recommended upper limit SOC PU is smaller the higher the SOC P is. As shown in FIG. 7A, the reward R provided to the user when the SOC P of the battery 42 is greater than or equal to the recommended lower limit SOC PL and less than or equal to the recommended upper limit SOC PU is greater than the reward R provided to the user when the SOC P is greater than the recommended upper limit SOC PU.

FIG. 7B shows an example of a table 130B in which magnitudes of a reward R provided according to the SOC P of the battery 42 are set. The table 130B shown in FIG. 7B corresponds to the graph showing the magnitude of the reward R corresponding to the SOC P shown in FIG. 7A.

The magnitude of the reward R is zero when the SOC P is greater than or equal to zero and less than the recommended lower limit SOC PL ($0 \leq P < PL$). The magnitude of the reward R is R1 when the SOC P is greater than or equal to the recommended lower limit SOC PL and less than or equal to the recommended upper limit SOC PU ($PL \leq P \leq PU$). The magnitude of the reward R is expressed by Expression (2) if the SOC P is greater than the recommended upper limit SOC PU ($PU < P \leq 100$). In other words, the one or more processors of the battery charging control system determine, during charging of the battery, a charging control parameter including a reward using SOC based on the following Expression (2).

$$R = R1 - (P - PU) \times R1/(100 - PU) \qquad \text{Expression (2):}$$

The table 130B is stored in advance in the storage section 102. The reward providing section 112 provides the reward R to the user of the moving body 40 based on the table 130B and the SOC P of the battery 42 acquired by the acquiring section 110. The transmitting section 114 transmits the reward information 80 concerning the reward R provided to the user to the user terminal 30.

Third Modification

Figures 8A, 8B:
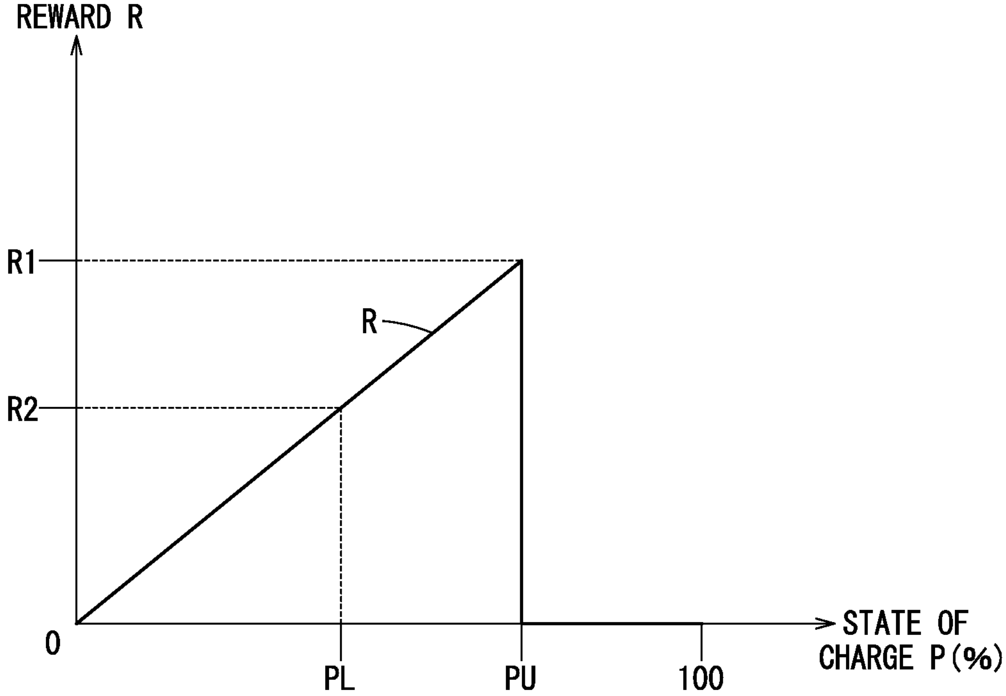
FIG. 8A is a graph showing an example of the magnitude of a reward provided according to the state of charge of the battery.
FIG. 8B shows an example of a table in which magnitudes of a reward provided according to the state of charge of the battery are set.

The user may be provided with a reward R if the SOC P is less than the recommended lower limit SOC PL. FIG. 8A is a graph showing an example of the magnitude of a reward R provided according to the SOC P of the battery 42. The magnitude of the reward R provided to the user when the SOC P is less than the recommended lower limit SOC PL is smaller the lower the SOC P is. The magnitude of the reward R is R2 when the SOC P is equal to the recommended lower limit SOC PL. The magnitude of the reward R is zero when the SOC P is zero.

As shown in FIG. 8A, the reward R provided to the user when the SOC P of the battery 42 is greater than or equal to the recommended lower limit SOC PL and lower than or equal to the recommended upper limit SOC PU is greater than the reward R provided to the user when the SOC P is lower than the recommended lower limit SOC PL.

FIG. 8B shows an example of a table 130C in which magnitudes of a reward R provided according to the SOC P of the battery 42 are set. The table 130C shown in FIG. 8B corresponds to the graph showing the magnitude of the reward R corresponding to the SOC P shown in FIG. 8A.

The magnitude of the reward R is expressed by Expression (3) when the SOC P is greater than or equal to zero and less than the recommended lower limit SOC PL ($0 \leq P < PL$). The magnitude of the reward R is expressed by Expression (1) described above when the SOC P is greater than or equal to the recommended lower limit SOC PL and less than or equal to the recommended upper limit SOC PU ($PL \leq P \leq PU$). The magnitude of the reward R is zero when the SOC P is greater than the recommended upper limit SOC PU ($PU < P \leq 100$). In other words, the one or more processors of the battery charging control system determine, during charging of the battery, a charging control parameter including a reward using SOC based on the following Expression (3).

$$R = P \times R1/PU \qquad \text{Expression (3):}$$

The table 130C is stored in advance in the storage section 102. The reward providing section 112 provides the reward R to the user of the moving body 40 based on the table 130C and the SOC P of the battery 42 acquired by the acquiring section 110. The transmitting section 114 transmits the reward information 80 concerning the reward R provided to the user to the user terminal 30.

Invention Obtainable from the Embodiments

The following is a record of the invention that can be understood from the embodiment and modifications described above.

(1) A reward providing device (10) includes: an acquiring section (110) that acquires, when charging of the battery by a charging device (50) is completed, battery charge amount information (70) concerning a battery charge amount that is a charge amount (P) of the battery (42) provided to a moving body (40); and a reward providing section (112) that provides a reward (R) to a user of the moving body when the battery charge amount is less than or equal to a recommended upper limit charge amount (PU) that is an upper limit of a recommended charge amount set to be lower than a full charge, serving as a charge amount that is recommended. Due to this, the user is motivated to try to finish charging of the battery before the charging efficiency drops, and therefore it is possible to encourage shortening of the battery charging time.

(2) The reward provided to the user when the battery charge amount is less than or equal to the recommended upper limit charge amount may be greater than the reward provided to the user when the battery charge amount is greater than the recommended upper limit charge amount. Due to this, the user is highly motivated to try to finish charging of the battery before the charging efficiency drops, and therefore it is possible to more strongly encourage shortening of the battery charging time.

(3) The reward provided to the user when the battery charge amount is greater than the recommended upper limit charge amount may be smaller the higher the battery charge amount is. Due to this, the user is highly motivated to try to finish charging of the battery before the charging efficiency drops, and therefore it is possible to more strongly encourage shortening of the battery charging time.

(4) The reward need not be provided to the user when the battery charge amount is greater than the recommended upper limit charge amount. Due to this, the user is highly motivated to try to finish charging of the battery before the charging efficiency drops, and therefore it is possible to more strongly encourage shortening of the battery charging time.

(5) The recommended upper limit charge amount may be in a range from 60% to 80% of a full charge. Due to this, the possibility of the charging being completed before the charging efficiency drops is increased.

(6) When the battery charge amount is less than a recommended lower limit charge amount (PL) that is a lower limit of the recommended charge amount, the reward may be smaller the lower the battery charge amount is, and the reward provided when the battery charge amount is greater than or equal to the recommended lower limit charge amount may be greater than the reward provided when the battery charge amount is lower than the recommended lower limit charge amount. Due to this, the possibility of suppressing battery degradation is increased.

(7) The reward need not be provided when the battery charge amount is less than a recommended lower limit charge amount (PL) that is set in advance to be less than the recommended upper limit charge amount. Due to this, the possibility of suppressing battery degradation is further increased.

(8) The reward providing device may further comprise a transmitting section (114) that transmits the battery charge amount information at a time when the battery is being charged to a terminal (30) possessed by the user, via a communication network (20). Due to this, the user can easily utilize the reward.

(9) The reward may be a reward that can be utilized when the user uses the charging device. Due to this, it is easy for individual power suppliers to provide a reward.

(10) The reward may be a discount on a usage fee of the charging device. Due to this, it is even easier for individual power suppliers to provide a reward.

(11) The reward may be a reward that can be utilized when the user uses an establishment associated with the charging device. Due to this, the user can be provided with a suitable reward.

(12) A reward providing method includes: an acquisition step of acquiring, when charging of a battery by a charging device (50) is completed, battery charge amount information (70) concerning a battery charge amount (P) that is a charge amount of the battery (42) provided to a moving body (40); and a reward providing step of providing a reward to a user of the moving body when the battery charge amount is less than or equal to a recommended upper limit charge amount (PU) that is an upper limit of a recommended charge amount set to be lower than a full charge, serving as a charge amount that is recommended. Due to this, the user is motivated to try to finish charging of the battery before the charging efficiency drops, and therefore it is possible to encourage shortening of the battery charging time.

(13) A non-transitory computer-readable storage medium storing a program causing a computer to execute: an acquisition step of acquiring, when charging of the battery by a charging device (50) is completed, battery charge amount information (70) concerning a battery charge amount (P) that is a charge amount of the battery (42) provided to a moving body (40); and a reward providing step of providing a reward to a user of the moving body when the battery charge amount is less than or equal to a recommended upper limit charge amount (PU) that is an upper limit of a recommended charge amount set to be lower than a full charge, serving as a charge amount that is recommended. Due to this, the user is motivated to try to finish charging of the battery before the charging efficiency drops, and therefore it is possible to encourage shortening of the battery charging time.

The present invention is not limited to the above-described embodiments, and various modifications could be adopted therein without departing from the essence and gist of the present invention.

The invention claimed is:

1. A reward providing device including a battery charging control system comprising one or more processors that execute computer-executable commands stored in a memory, wherein the one or more processors execute the computer-executable commands to cause the reward providing device to:

acquire, in real time from a battery management system of a charging device electrically coupled to a battery of a moving body, a battery state-of-charge (SOC) information;

determine, during charging of the battery, a charging control parameter including a reward using the battery SOC based on one of the following Expressions:

$$R=R2+(P-PL)\times(R1-R2)/(PU-PL),\ \text{when } PL\leq P\leq PU; \quad \text{Expression (1):}$$

$$R=R1-(P-PU)\times RI/(100-PU),\ \text{when } PU<P\leq 100;\ \text{and} \quad \text{Expression (2):}$$

$$R=P\times R1/PU,\ \text{when } 0\leq P<PL; \quad \text{Expression (3):}$$

where,

R is the charging control parameter corresponding to a magnitude of the reward;

P is the SOC;

PU is a recommended upper limit SOC lower than a full charge;

PL is a recommended lower limit SOC;

R1 is a maximum value of the charging control parameter resulting into a highest magnitude of reward; and R2 is a minimum value of the charging control parameter resulting into a lowest magnitude of reward, and generate, based on the charging control parameter, a charging control signal that causes termination of charging;

transmit the charging control signal to the charging device to automatically implement the termination of charging;

update the charging control parameter during charging based on updated SOC information; and transmit information corresponding to the charging control parameter to a user terminal, wherein the charging control parameter increases within a range between PL and PU and decreases outside the range so as to: reduce time spent in a high SOC region associated with reduced charging efficiency, and suppress battery degradation associated with charging outside the range.

2. The reward providing device according to claim 1, wherein the reward provided to the user when the battery SOC is less than or equal to the recommended upper limit SOC is greater than the reward provided to the user when the battery SOC is greater than the recommended upper limit SOC.

3. The reward providing device according to claim 2, wherein the reward provided to the user when the battery SOC is greater than the recommended upper limit SOC is smaller the higher the battery SOC is.

4. The reward providing device according to claim 2, wherein the reward is not provided to the user when the battery SOC is greater than the recommended upper limit SOC.

5. The reward providing device according to claim 1, wherein the recommended upper limit SOC is in a range from 60% to 80% of the full charge.

6. The reward providing device according to claim 2, wherein:

when the battery SOC is less than the recommended lower limit SOC, the reward is smaller the lower the battery SOC is; and the reward provided when the battery SOC is greater than or equal to the recommended lower limit SOC is greater than the reward provided when the battery SOC is lower than the recommended lower limit SOC.

7. The reward providing device according to claim 2, wherein the reward is not provided when the battery SOC is less than the recommended lower limit SOC, which is set in advance to be less than the recommended upper limit SOC.

8. The reward providing device according to claim 1, wherein the reward providing device transmits the battery SOC information to the user terminal, via a communication network.

9. The reward providing device according to claim 1, wherein the reward is a reward that can be utilized when the user uses the charging device.

10. The reward providing device according to claim 9, wherein the reward is a discount on a usage fee of the charging device.

11. The reward providing device according to claim 1, wherein:

the reward is a reward that can be utilized when the user uses an establishment associated with the charging device.

12. A reward providing method using a reward providing device including a battery charging control system, said reward providing method comprising:

acquiring, in real time from a battery management system of a charging device electrically coupled to a battery of a moving body, a battery state-of-charge (SOC) information;

determining, during charging of the battery, a charging control parameter including a reward using the battery SOC based on one of the following Expressions:

$$R=R2+(P-PL)\times(R1-R2)/(PU-PL),\text{ when } PL\leq P\leq PU; \quad \text{Expression (3):}$$

$$R=R1-(P-PU)\times RI/(100-PU),\text{ when } PU<P\leq 100;\text{ and} \quad \text{Expression (2):}$$

$$R=P\times R1/PU,\text{ when } 0\leq P<PL; \quad \text{Expression (3):}$$

where,

R is the charging control parameter corresponding to a magnitude of the reward;

P is the SOC;

PU is a recommended upper limit SOC lower than a full charge;

PL is a recommended lower limit SOC;

R1 is a maximum value of the charging control parameter resulting into a highest magnitude of reward; and R2 is a minimum value of the charging control parameter resulting into a lowest magnitude of reward, and generating, based on the charging control parameter, a charging control signal that causes termination of charging, transmitting the charging control signal to the charging device to automatically implement the termination of charging;

updating the charging control parameter during charging based on updated SOC information; and transmitting information corresponding to the charging control parameter to a user terminal, wherein the charging control parameter increases within a range between PL and PU and decreases outside the range so as to: reduce time spent in a high SOC region associated with reduced charging efficiency, and suppress battery degradation associated with charging outside the range.

13. A non-transitory computer-readable storage medium storing a program, wherein the program causes a computer to execute:

acquiring, in real time from a battery management system of a charging device electrically coupled to a battery of a moving body, a battery state-of-charge (SOC);

determining, during charging of the battery, a charging control parameter including a reward using the battery SOC based on one of the following Expressions:

$$R=R2+(P-PL)\times(R1-R2)/(PU-PL),\text{ when } PL\leq P\leq PU; \quad \text{Expression (1):}$$

$$R=R1-(P-PU)\times RI/(100-PU),\text{ when } PU<P\leq 100;\text{ and} \quad \text{Expression (2):}$$

$$R=P\times R1/PU,\text{ when } 0\leq P<PL; \quad \text{Expression (3):}$$

where,

R is the charging control parameter corresponding to a magnitude of the reward;

P is the SOC;

PU is a recommended upper limit SOC lower than a full charge;

PL is a recommended lower limit SOC;

R1 is a maximum value of the charging control parameter resulting into a highest magnitude of reward; and R2 is a minimum value of the charging control parameter resulting into a lowest magnitude of reward, and generating, based on the charging control parameter, a charging control signal that causes termination of charging, transmitting the charging control signal to the charging device to automatically implement the termination of charging;

updating the charging control parameter during charging based on updated SOC information; and transmitting information corresponding to the charging control parameter to a user terminal, wherein the charging control parameter increases within a range between PL and PU and decreases outside the range so as to: reduce time spent in a high SOC region associated with reduced charging efficiency, and suppress battery degradation associated with charging outside the range.

* * * * *